Feb. 21, 1961   P. A. KENYON   2,972,460
HANGER ASSEMBLY
Filed Feb. 17, 1958
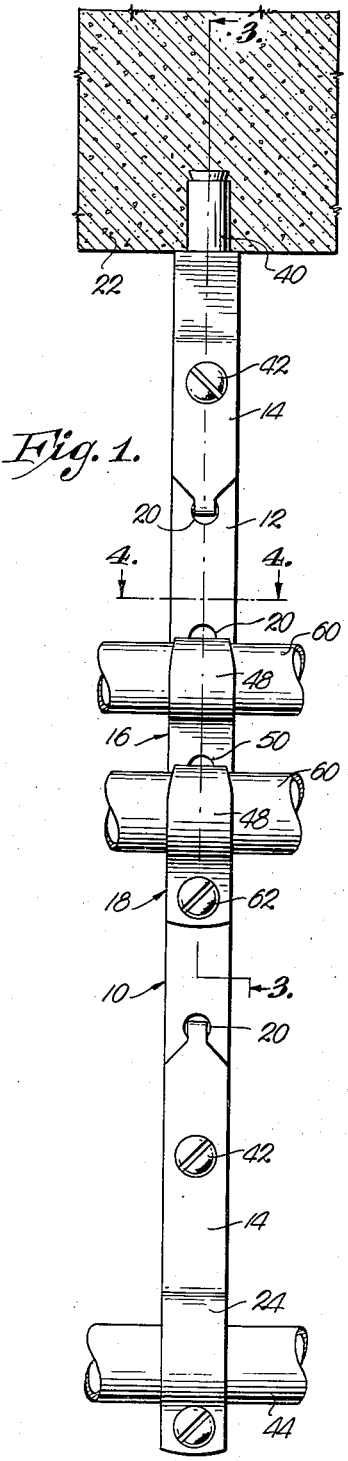
Fig. 1.
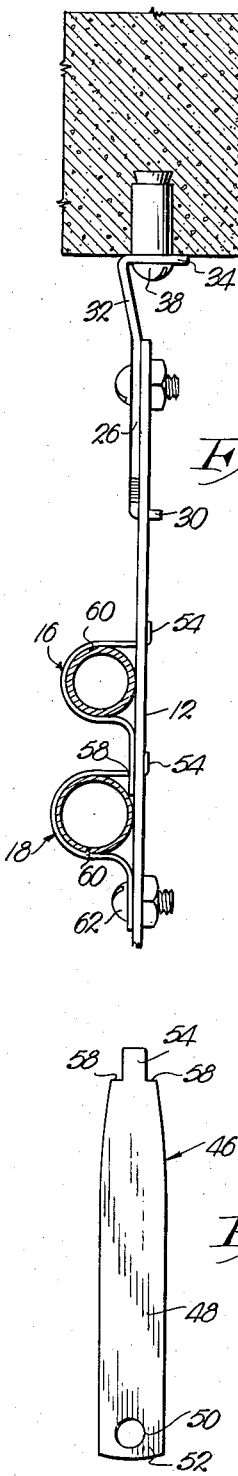
Fig. 2.
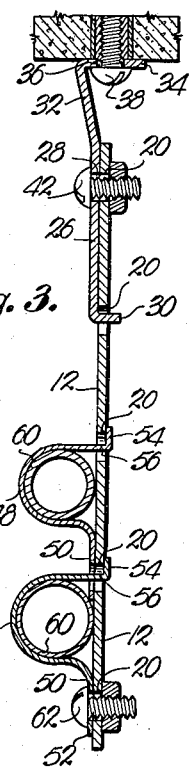
Fig. 3.
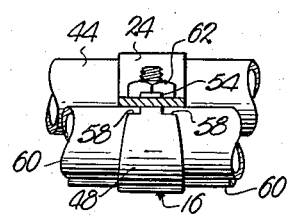
Fig. 4.
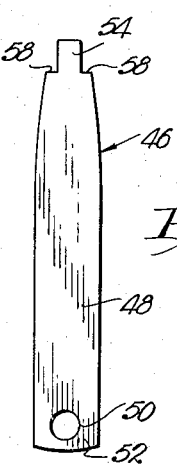
Fig. 5.
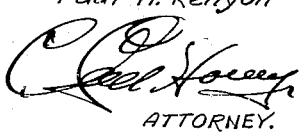
INVENTOR.
Paul A. Kenyon
BY
ATTORNEY.

United States Patent Office 2,972,460
Patented Feb. 21, 1961

2,972,460

HANGER ASSEMBLY

Paul A. Kenyon, Rte. 3, Box 360, Parkville, Mo.

Filed Feb. 17, 1958, Ser. No. 715,747

3 Claims. (Cl. 248—62)

This invention relates to hanger structure and more particularly, to a simple, inexpensive hanger assembly for suspension of fixtures and conduits or the like from ceilings or other supports.

The most important object of this invention is to provide a hanger assembly wherein the components thereof are formed of initially flat blanks of which certain ones are bent to suitable configurations to present bracket devices which may be mounted in any one of a number of positions on an enlongated strip having a number of longitudinally spaced openings therein, thereby making the assembly universally adaptable for suspension of various conduits and fixtures in any one or more of a number of predetermined positions relative to the ceiling or other support.

A further important object of this invention is to provide a relatively inexpensive and simple hanger assembly as described wherein the brackets adapted for suspending a conduit or similar component from the elongated strip having a series of longitudinally spaced openings therein are identical and may be arranged on the strip in proximal, longitudinally extending relationship so that a number of conduits may be supported by the same strip in parallel, spaced relationship.

Another important object of the instant invention is to provide a hanger assembly wherein the initially flat strip and bracket blanks may be stamped out by commercially available, relatively inexpensive machines, thus materially reducing the overall cost of the assembly and permitting the hanger structure to be distributed at a low unit cost.

Other important objects of the invention relate to the provision of a hanger assembly of the aforementioned character wherein the brackets adapted for supporting a conduit on the strip have laterally extending tab means on one end thereof adapted to be releasably hooked in a corresponding opening in the strip, and a perforation in the opposite end thereof being adapted to be aligned with another opening in the strip so that the bracket may be easily attached to the strip by merely hooking the tab means in one of the openings in the strip and thereupon inserting fastening means in the nature of a bolt through the aligned perforation in the bracket and the corresponding opening in the strip, followed by placement of a nut on the bolt so that the bracket is securely attached to the strip; to the provision of a hanger assembly as described wherein a plurality of the brackets may be disposed on the strip with only one fastening means in the nature of a bolt and nut being necessary to hold all of the conduit brackets in place on the strip; to an assembly wherein the brackets are adapted to be disposed on the strip in a row with the tab means thereon extending in the same direction and overlapped with the proximal end of an adjacent bracket, and extending through the perforation therein and adapted to be releasably hooked in the corresponding aligned opening in the strip, whereby each adjacent bracket serves as means for holding another proximal bracket in position on the strip; to the provision of shoulder means adjacent the tab means on each of the brackets whereby when a plurality of the brackets are disposed in a longitudinally extending row on the strip, the shoulder means maintain the proximal perforated ends of adjacent brackets in engagement with the strip; to the provision of a hanger device for suspending the strip from a support which may be attached to the strip by utilization of only a single bolt and nut; to an assembly wherein the brackets may be disposed on the strip in the aforementioned longitudinally arranged row with such brackets positioned on either side of the strip to thereby permit the conduits to be hung from the ceiling in a number of different positions; and to other important objects and details of construction which will become obvious or apparent as the following specification progresses.

In the drawing:

Figure 1 is a fragmentary, front elevational view of a hanger assembly constructed according to the concepts of the instant invention and showing all of the component parts thereof, illustrating the manner in which conduits or similar devices may be suspended from an overhead support;

Fig. 2 is a fragmentary, side elevational view of the hanger illustrated in Fig. 1 with the conduits supported by the assembly being shown in section;

Fig. 3 is a vertical, cross-sectional view taken substantially on the broken line 3—3 of Fig. 1;

Fig. 4 is a horizontal, cross-sectional view taken on the line 4—4 of Fig. 1 and looking downwardly in the direction of the arrows; and Fig. 5 is a plan view of a bracket blank showing the form thereof before the same is bent into U-shaped configuration.

A hanger assembly constructed in accordance with the preferred concepts of the present invention and broadly designated by the numeral 10 includes as basic components thereof an elongated strip 12, a hanger device 14 adapted to be attached to each end of strip 12, and a plurality of brackets, a pair of which and designated by the numerals 16 and 18 are adapted to be disposed on strip 12 between hanger devices 14.

Strip 12 is formed of an elongated length of metal and is provided with a series of equally spaced, longitudinally disposed openings 20 preferably extending substantially the entire length of strip 12. Hanger devices 14 are provided for suspending strip 12 from an overhead support 22 in the nature of a ceiling or similar construction and for suspending a conduit mount 24 from the lowermost end of strip 12 if so desired. Each of the hanger devices 14 is substantially L-shaped in configuration and includes a longitudinal, intermediate stretch 26 having an opening 28 therein adapted to be aligned with one of the openings 20 in strip 12, and a tab 30 integral with one end of stretch 26 and extending laterally from stretch 26, as clearly shown in Fig. 3. Tab 30 is spaced from opening 28 in stretch 26 a distance equal to the space between openings 20 in strip 12 so that, upon alignment of opening 28 in stretch 26 with an opening 20 in strip 12, tab 30 extends through an adjacent opening 20.

Stretch 32 of hanger device 14 integral with stretch 26 and disposed in opposition to tab 30 is bent at an angle from stretch 26 in a direction away from the tab 30, and a length 34 of device 14 integral with the end of stretch 32 away from intermediate stretch 26 is disposed in perpendicular relationship to stretch 26 and has an opening 36 therein adapted to receive a bolt 38 which may be threaded into a suitable sleeve 40 adapted to be embedded in support 22. Stretch 32 of hanger device 14 is bent at an angle so that opening 36 in length 34 is directly aligned with the longitudinal length of strip 12 when the latter is secured to device 14, whereby the strip 12 is positioned directly beneath bolt 38 attaching hanger device 14 to support 22. Hanger device 14 may be secured to strip 12 by utilization of bolt and nut means 42 passing through opening 28 in stretch 26 and the corresponding aligned opening 20 in strip 12. Although support 22 has been illustrated as being of cementitious nature with sleeve 40 embedded in the same, it can be appreciated that if support 22 is of a different type of material, such as metal or wood, sleeve 40 may be eliminated and length 34 of hanger device 14 may be readily attached to such overhead means by utilization of bolt 38.

As indicated in Fig. 1, a hanger device 14 may also be positioned at the lowermost end of strip 12 for attaching U-shaped mount 24 to strip 12, and the lower hanger device 14 is of identical construction with the upper device 14 and need not be described in detail. It is pointed out, however, that mount 24 may be constructed to support a conduit 44 beneath strip 12.

Brackets 16 and 18 are formed from an identical initially flat blank broadly designated 46 and illustrated in its initial state in Fig. 5. Blank 46 may be stamped out of a flat sheet of metal and has an elongated main stretch 48 provided with a perforation 50 in end 52 thereof, and having a longitudinally projecting tab 54 on the end 56 of the same which has a substantially narrower, transverse width than that of stretch 48 to thereby present a pair of opposed shoulders 58 between stretch 48 and tab 54.

Stretch 48 of blank 46 between perforation 50 and tab 54 is bent into U-shaped configuration, as clearly shown in Figs. 2 and 3, to receive a conduit such as 60. The blank 46 is bent in a manner so that tab 54 and perforation 50 are spaced apart a distance substantially equal to the distance between openings 20 in strip 12. The tab 54 and end 52 of blank 46 lie in parallel planes upon bending of stretch 48 but, as illustrated in Fig. 3, the plane through tab 54 is spaced from a plane through end 52 a distance substantially equal to the thickness of strip 12. Any number of the blanks 46 bent into the described configuration may be disposed on strip 12 depending upon the length thereof and the number of openings 20 in the same but, for purposes of illustration, a pair of brackets 16 and 18 are shown mounted in position on strip 12 in Figs. 1, 2 and 3.

Initially the tab 54 of bracket 16 is hooked in one of the openings 20, then conduit 60 is placed in position and the end 52 thereof is moved downwardly into overlying relationship with strip 12 with the perforation 50 thereof in alignment with a corresponding opening 20 in strip 12. Thereupon, the tab 54 of bracket 18 is passed through perforation 50 in bracket 16 and then hooked in the aligned opening 20 in strip 12. Another conduit 60 is inserted in bracket 18 and the end 52 of the latter is moved downwardly into engagement with strip 12 with the perforation 50 therein in alignment with a corresponding opening in strip 12. Bolt and nut means 62 passed through perforation 50 in bracket 18 and opening 20 in strip 12 serves to secure bracket 18 and thereby bracket 16 to strip 12.

It is now apparent that any number of brackets such as 16 and 18 may be positioned upon strip 12 and only one bolt and nut means such as 62 is necessary to hold such brackets in correct position on strip 12. Shoulders 58 on each of the brackets 16 and 18 engage the proximal surface of end 52 of an adjacent bracket to maintain such end 52 in engagement with the surface of strip 12 and thereby maintaining conduit 60 in firm engagement with strip 12. It can be appreciated that blanks 46 may be made of different lengths to accommodate conduits 60 of varying diameters and the only consideration is that tab 54 and perforation 50 must be spaced apart a distance equal to the spacing of openings 20 in strip 12.

Furthermore, brackets 16 or 18 may be positioned on either side of strip 12, and the tabs 54 overlying either strip 12 or an adjacent end 52 of a proximal bracket will prevent such end from moving away from the surface of strip 12.

Because of the fact that strip 12, hanger devices 14 and brackets 16 and 18 may be stamped out of sheet material with commercially available, relatively inexpensive machines, the unit cost of each of the components is relatively low and the entire assembly 10 may be marketed at a much lower price than previously provided hangers of this nature. Brackets 16 and 18 may be placed in position on strip 12 in a short period of time and the fact that only one bolt and nut means such as 62 is necessary to secure all of the brackets to strip 12 saves considerable time, inasmuch as it is necessary to only screw one nut onto one bolt to attach all of the brackets to strip 12. The same is true in attachment of hanger devices 14 to strip 12 and therefore, the entire assembly may be suspended from support 12 with a minimum of effort and time.

Having thus described the invention what is claimed as new and desired to be secured by Letters Patent is:

1. In a hanger assembly, an elongated strip provided with a series of longitudinally spaced openings therein; a plurality of elongated brackets each provided with laterally extending substantially J-shaped tab means at one end thereof and having a perforation in the opposite end thereof, said openings being of a diameter only slightly greater than the width of each of said tab means and said brackets being arranged on the strip in a row in proximal longitudinally extending relationship with the tab means thereon extending in the same direction, the perforation in each of the brackets being aligned with a corresponding opening in the strip and said tab means overlapping the proximal end of an adjacent bracket and extending through the perforation therein, through the strip and hooked in the corresponding aligned opening in the strip, the tab means on the bracket at one end of said row remote from the remaining brackets being hooked in another of said openings in the strip; and fastening means passing through the perforation in the bracket at the opposite end of the row and through the aligned opening in the strip for securing the respective bracket and thereby all of the remaining brackets to the strip.

2. A hanger assembly as set forth in claim 1 wherein each of the brackets is provided with shoulder means adjacent said tab means for maintaining said opposite ends of the brackets overlapped by said one end of a proximal bracket and in engagement with the strip.

3. A hanger assembly as set forth in claim 1 wherein the portion of each of the brackets between the tab means thereon and the perforation in the opposite end is substantially U-shaped in configuration and extends away from said strip.

References Cited in the file of this patent

UNITED STATES PATENTS

| 1,376,284 | Kohn | Apr. 26, 1921 |
| 1,734,356 | Welch | Nov. 5, 1929 |
| 1,752,928 | Prentice | Apr. 1, 1930 |
| 2,394,518 | Kindorf | Feb. 5, 1946 |
| 2,485,891 | Kindorf | Oct. 25, 1949 |

FOREIGN PATENTS

| 300,125 | Switzerland | Sept. 16, 1954 |
| 652,676 | Great Britain | May 2, 1951 |
| 1,124,412 | France | July 2, 1956 |